Figure 1:
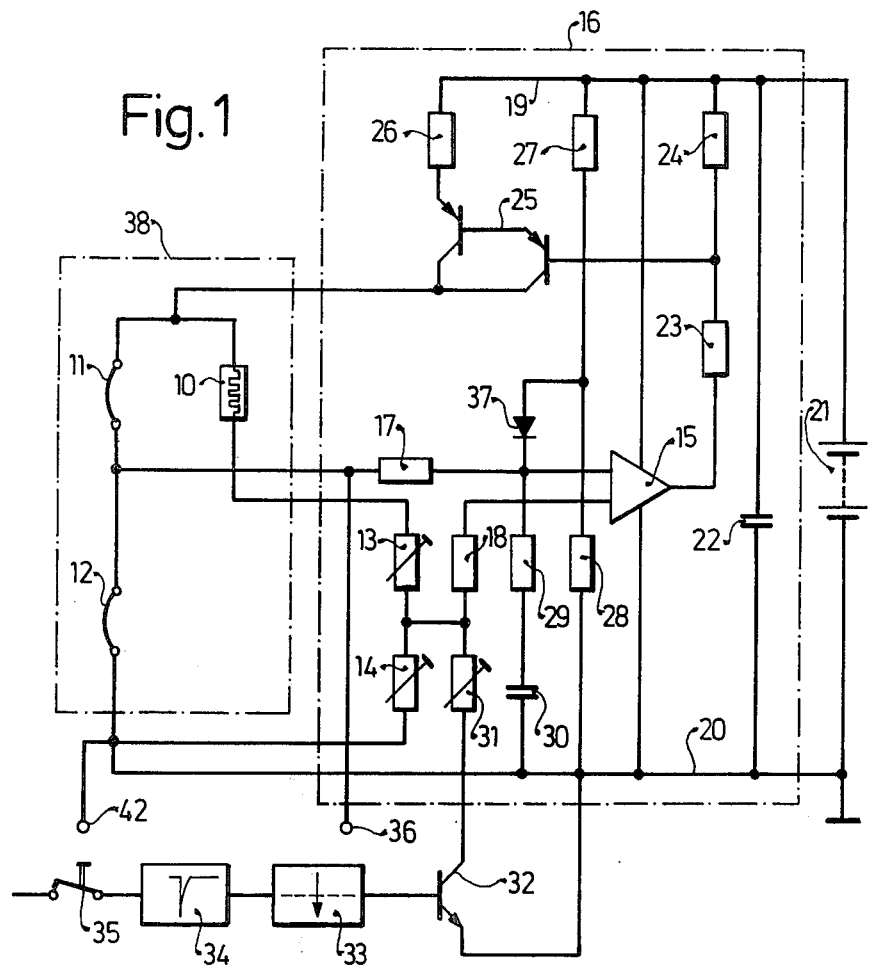

United States Patent [19]

Peter

[11] 4,196,622
[45] Apr. 8, 1980

[54] METHOD AND APPARATUS FOR IMPROVING THE RELIABILITY OF AN AIRFLOW MEASURING SYSTEM

[75] Inventor: Cornelius Peter, Stuttgart, Fed. Rep. of Germany

[73] Assignee: Robert Bosch GmbH, Stuttgart, Fed. Rep. of Germany

[21] Appl. No.: 944,587

[22] Filed: Sep. 21, 1978

[30] Foreign Application Priority Data

Sep. 11, 1977 [DE] Fed. Rep. of Germany ....... 2750050

[51] Int. Cl.² .............................................. G01F 1/68
[52] U.S. Cl. ................................................. 73/204
[58] Field of Search ..................................... 73/204

[56] References Cited

U.S. PATENT DOCUMENTS

| 2,726,546 | 12/1955 | King, Jr. | 73/204 |
| 3,363,462 | 1/1968 | Sabin | 73/204 |
| 3,464,269 | 9/1969 | Froger | 73/204 |
| 3,577,785 | 5/1971 | Guevrekian | 73/750 |

OTHER PUBLICATIONS

Grant et al., "Fundamentals of Hot Wire Anemometry", in Symp. on Measurement in Unsteady Flow, 1962, pp. 44, 48 and 51.

Primary Examiner—Herbert Goldstein
Attorney, Agent, or Firm—Frishauf, Holtz, Goodman & Woodward

[57] ABSTRACT

Undesired deposits accummulating on the surface of a temperature-varying airflow sensing resistor are burned off periodically by increasing the current through it. To eliminate errors caused by a reversal in the direction of airflow, a temperature independent resistor is placed downstream of the temperature-varying resistor and is maintained at the same operating temperature as the latter.

29 Claims, 2 Drawing Figures

4,196,622

METHOD AND APPARATUS FOR IMPROVING THE RELIABILITY OF AN AIRFLOW MEASURING SYSTEM

The present invention relates to apparatus for measuring the quantity of airflowing through a particular part of a system, and, in particular, to the quantity of airflowing through the air intake of an internal combustion engine.

BACKGROUND AND PRIOR ART.

Apparatus is known in which the quantity of air flowing through the air intake of an internal combustion engine is measured by means of a sensing element whose resistance varies as a function of temperature. This sensing element is positioned in the airflow and its change in resistance corresponds to the quantity of airflowing thereby. The sensing element forms part of a bridge circuit. A regulating circuit increases the current through the sensing element until the bridge is rebalanced, that is the sensing element is kept at a substantially constant operating temperature. The change in current constitutes a measure of the quantity of airflowing past the sensing element, see, for example U.S. Pat. No. 3,747,577. This system has the disadvantage that deposits will accumulate on the sensing element during its operating life, thereby greatly decreasing the accuracy of the measurements. Further, under certain operating conditions of an internal combustion engine, it is possible that reversal in the direction of airflow take place, causing errors.

THE INVENTION

Is an object of the present invention to substantially eliminate the above mentioned deposits and to make the measurement relatively insensitive to air flowing in the reversed direction.

In accordance with a method of the present invention, the current through the sensing element is increased periodically when the engine is OFF until such time as the temperature of the sensing element reaches a predetermined temperature required to burn off the above mentioned deposits.

In apparatus according to a feature of the present invention additional heating means are provided which operate when the engine is off and at selected time instants throughout the operating life of the sensing element to increase the temperature of the sensing element above the operating temperature sufficiently to cause the burning off of the deposits. Further, in accordance with a feature of the present invention, a temperature-independent resistance element is positioned downstream of the sensing element in the normal direction of airflow to air heat flowing in the reverse direction prior to the time this air impinges upon the sensing element. When the temperature of the temperature-independent resistance element and the sensing element are substantially the same, the heated air will not cause resistance changes in the sensing element, thereby preventing errors in measurement.

In a preferred embodiment of the invention the sensing and regulating circuit element are all enclosed in the same housing thereby minimizing interference from, for example, the ignition system.

DRAWINGS ILLUSTRATING A PREFERRED EMBODIMENT

Figure 2:
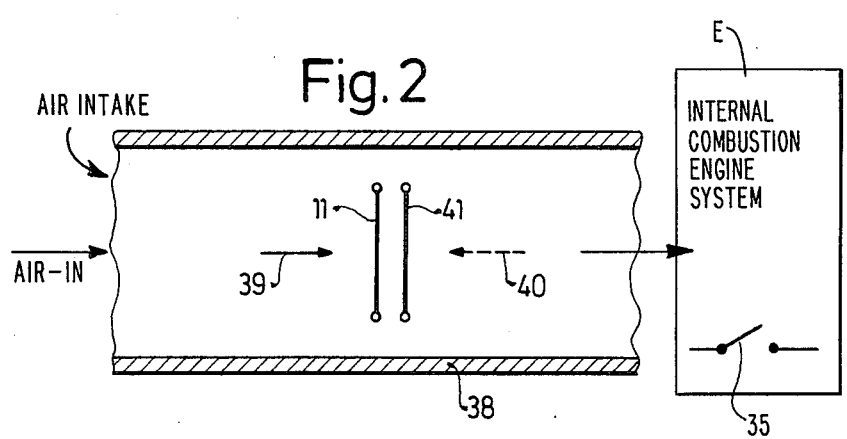

FIG. 1 is a circuit diagram of a preferred embodiment of the present invention; and FIG. 2 shows two resistance elements positioned in the air intake of an internal combustion engine.

The bridge circuit shown in FIG. 1 includes a temperature-varying resistor 10, a temperature-varying resistor 11, a resistor 12, a resistor 13 and a resistor 14. Bridge output terminals are connected to an operational amplifier 15 which forms part of a regulator circuit 16. Specifically, the inverting input of amplifier 15 is connected through a resistor 17 to the common point of resistors 11 and 12, while the direct input of amplifier 15 is connected through a resistor 18 to the common point of resistors 13 and 14. A first and second supply line, 19, 20 connect operational amplifier 15 to a DC voltage source 21. A filter capacitor 22 is connected in parallel with DC voltage source 21. The output of operational amplifier 15 is connected through a series circuit including resistors 23 and 24 to line 19. Resistances 23 and 24 form a voltage divider for a Darlington circuit 25 which together with a resistor 26 forms a voltage-controlled current source for the bridge circuit. A voltage divider including resistors 27 and 28 is connected between lines 19 and 20. The common point of resistors 27 and 28 is connected to the anode of a diode 37 whose cathode is connected to the inverting input of amplifier 15. A series circuit including a resistor 29 and a capacitor 30 is connected between the inverting input of amplifier 15 and line 20. This resistor-capacitor circuit tunes the regulating circuit to the response time of the hot wire. In a preferred embodiment utilizing a platinum wire with 70 mm diameter as temperature-varying resistor, the values of resistance and capacitance of resistor 29 and capacitor 30 were 680K $\Omega$ and 33 $\mu$F, when utilizing a value of 47, $\mu\Omega$ for resistor 17.

The common point of resistors 13 and 14 is also connected to a variable resistor 31 whose other terminal is connected to the emitter-collector circuit of a transistor 32. The base of transistor 32 is connected to the output of a monostable multivibrator 33 whose input is connected to the output of a differentiating circuit 34. The input of differentiating circuit 34 is connected to a switch 35 which, preferably, is the ignition switch of the internal combustion engine.

OPERATION:

A predetermined current flows through temperature-varying resistor 11 of the bridge circuit and heats resistor 11 to its normal operating temperature. Temperature-varying resistor 10 is connected in another branch of the bridge circuit and is physically located in the air intake away from the airflow so that it is responsive to the temperature in the air intake but not responsive to the quantity of air flowing therethrough. The temperature of air in the air intake thus serves as a reference signal for the bridge circuit, that is the effect of changes of temperature in the air intake on resistor 11 is substantially eliminated. Resistor 11 is cooled to greater or lesser extent depending upon the quantity of air flowing thereby. This causes the bridge circuit to be unbalanced. The balance of the bridge circuit is restored by an increase in current through resistor 11 as furnished by constant current source 23, 24, 25 and 26 in response to an increase of voltage applied to the constant current source by amplifier 15. The current flowing through the bridge circuit is a measure of the quantity of air flowing past resistor 11. A corresponding electrical signal can be derived between terminal 36 and 42.

Starting up of the regulating circuit is facilitated by voltage divider 27 and 28 and diode 37. When the equipment is first energized, the voltage at the inverting input of amplifier 15 is forced to a value of approximately 0.5 volts, thereby insuring that the circuit will start functioning and providing a minimum signal. During normal operation of the equipment, the voltage at the inverting input of amplifier 15 will be substantially higher than the start-up voltage so that diode 37 will be blocked, thereby eliminating any influence of voltage divider 27, 28 on the circuit and its control operation.

During its operating life, resistor 11 will accumulate deposits on its surface. To burn off these deposits, it is desired that the current through resistor 11 will be increased at the predetermined time instants so that the temperature increases sufficiently to burn off the deposits. The selected time interval at which the burn off is to occur may, for example, be each time that the ignition switch is turned off. Thus, burn-off will occur when the engine is stopped, or OFF. The signal resulting from the turn-off of ignition switch 35 is differentiated in differentiator stage 34. The output signal from differentiator circuit 34 switches monostable multivibrator 33 to the unstable state. During this unstable state, transistor 32 becomes conductive causing resistor 31 to be connected in parallel with resistor 14 of the bridge circuit. This causes the bridge circuit including resistors 11, 12, 10, 13 and 14 to be sharply unbalanced in the sense in which amplifier 15 causes the constant current source to furnish a greatly increased current to the bridge circuit. This increased current heats temperature-dependent resistor 11 during the time that monostable multivibrator 33 is in the unstable state. The resistor is heated to a temperature sufficiently above the normal operating temperature so that deposits at its surface are burned off. In a preferred embodiment of the invention the time that monostable multivibrator 33 is in the unstable state is 3 seconds and the temperature reached by resistor 11 is 800° C.÷900° C.

Use of a structure-stabilized platinum wire as resistor 11 has been found to be particularly advantageous because this material is particularly suitable for heating to high temperatures. This of course is very important for the burn off process.

Broken line 38 in FIG. 1 indicates the physical location within the air intake. It should be noted that it is preferred that resistor 12 is also positioned in the air intake so that its heating losses can be carried away in the airflow. Resistors 13 and 14 are, preferably, adjustable resistors so that the temperature characteristic of the regulating circuit can be adjusted.

FIG. 2 is a diagram showing the intake pipe 38 of the internal combustion engine E. Temperature-dependent sensing element 11 is located in pipe 38. Under predetermined operating conditions of the internal combustion engine, for example at a low engine speed and full load, strong pulsations can occur in the intake pipe of the internal combustion engine. This can cause short time changes in the direction of airflow as indicated by broken arrow 40. An additional cooling of resistor 11 by the returning air takes place, causing incorrect measurement results. To eliminate or at least minimize this measurement error, a temperature independent resistor 41, electrically connected in series with resistor 11 is positioned downstream of resistor 11 in the normal direction of airflow. The two resistance values are at first equal, causing the two resistors to be at substantially the same temperature. Under normal conditions, that is with airflow in the direction indicated by arrow 39, resistor 41 has no effect. However, when the direction of airflow reverses for a short time, the returning air is preheated by resistor 41 before passing by resistor 11. In the ideal case the air prewarmed by resistor 41 has the same temperature as resistor 11 so that its influence on the temperature of resistor 11 is completely eliminated. In order to achieve this effect, resistor 41 must be connected into the bridge circuit. For example, resistor 41 could take the place of resistor 12.

Preferably, regulator circuit 16 is constructed as a hybrid circuit. Further, it is particularly advantageous to enclose the hybrid circuit with the elements which are arranged in the air intake, that is with the temperature-dependent resistor 10, temperature-dependent resistor 14 and, possibly, temperature-independent resistor 12 in a single housing. This greatly improves the reliability of the apparatus. Loose contacts for example at plug connections can no longer destroy sensor 11. Resistances in connecting lines between the bridge circuit and the operational amplifier are eliminated as is interference from, for example, the ignition circuit. The single housing also eliminates line reactances.

In a further preferred embodiment of the invention, Darlington stage 25 as well as resistor 26 are also arranged in the airflow so that the airflow also dissipates the heat generated in this stage.

Various changes and modifications may be made within the scope of the inventive concept.

I claim:

1. In an internal combustion system having an air intake pipe (38) to induct air thereto and a switching means capable of turning the engine OFF and subject to periodic operation upon operation of the engine system, an airflow measuring apparatus located in the intake pipe of the engine having a temperature-varying resistor (11) forming a sensing element positioned in said intake pipe, said temperature-varying resistor having a resistance characteristic varying as a function of the quantity of said airflow and a surface accumulating undesired deposits upon being exposed to said airflow, said airflow measuring apparatus further having regulator means (16) connected to said sensing element for furnishing a regulator signal maintaining said sensing element at a selected temperature, whereby said regulator signal constitutes a measure of said quantity of said airflow, the improvement comprising the combination of electrical current supply means (32, 31) capable of supplying a current to said temperature-varying resistor for increasing the temperature of said temperature-varying resistor above said selected temperature and to a level sufficient to burn off said undesired deposits;

and means controlled by said switching means upon said periodic operation and while the engine is OFF to connect said current supply means to said temperature varying resistor upon said periodic operation of said switching means.

2. Apparatus as set forth in claim 1, wherein said temperature varying resistor is a platinum wire.

3. Apparatus as set forth in claim 1, wherein said temperature varying resistor is a structurally stabilized platinum wire.

4. Apparatus as set forth in claim 1, wherein said airflow measuring apparatus comprises a bridge circuit;
wherein said temperature varying resistor is connected in said bridge circuit, said temperature varying resistor having a resistance changing as a function of said quantity of said airflow flowing thereby, thereby unbalancing said bridge circuit;
wherein said regulator means comprises means for furnishing a regulator current for reheating said temperature varying resistor back to said selected temperature independent of said quantity of said airflow, whereby the amplitude of said regulator current constitutes said measure of said quantity of said airflow;
and wherein said additional heating means comprises additional resistance means (31), and a switch means (32) connected to said additional resistance means for connecting said additional resistance means to said bridge circuit at said selected time instants such that said bridge circuit is unbalanced in a direction causing said regulator means to furnish a regulator current increasing said temperature of said sensing element above said selected temperature.

5. Apparatus as set forth in claim 4, wherein said switching means is an ignition switch;
wherein said selected time instants are the time instants at which said ignition switch is switched off;
wherein said switch means has a first stable state connecting said additional resistance means to said bridge circuit and a second stable state disconnecting said additional resistance means from said bridge circuit;
and wherein said additional heating means further comprises timing means (33) interconnected between said ignition switch and said switch means for maintaining said switch means in said first stable state for a predetermined time interval following the switching off of said ignition switch.

6. Apparatus as set forth in claim 5, wherein said timing means comprises a monostable multivibrator having a stable and an unstable state, and means for connecting said monostable multivibrator to said switch means in such a manner that said switch means in said first stable state while said monostable multivibrator is in said unstable state.

7. Apparatus as set forth in claim 6, further comprising differentiator circuit means (34) interconnected between said ignition switch and said monostable multivibrator in such a manner that monostable multivibrator is switched to said unstable state when said ignition switch is switched off.

8. Apparatus as set forth in claim 7, wherein said switch means comprises a transistor.

9. Apparatus as set forth in claim 4, wherein said regulator means comprises a voltage controlled current source (25, 26) connected to said bridge circuit for furnishing a controlled current having an amplitude varying as a function of an input voltage applied to said current source, and operational amplifier means (15) having an input connected to said bridge circuit and an output for furnishing said input voltage to said current source.

10. Apparatus as set forth in claim 4, wherein said operational amplifier means is located away from said air intake means;
and wherein said constant current source and said bridge circuit are located inside of said air intake means.

11. Apparatus as set forth in claim 1, wherein said airflow measuring apparatus further comprises a bridge circuit having a temperature-independent resistor (12);
wherein said temperature varying resistor is connected in series with said temperature independent resistor;
wherein said airflow measuring apparatus measures airflow in a first predetermined direction;
wherein said temperature varying resistor is subject to airflow in a second predetermined direction opposite to said first predetermined direction under predetermined operating conditions;
and wherein said temperature independent resistor is located downstream of said temperature varying resistor in said first predetermined direction of airflow for heating air flowing past said temperature dependent resistor in said second predetermined direction, thereby minimizing the change in resistance of said temperature varying resistor caused by said airflow in said second predetermined direction.

12. Apparatus as set forth in claim 1, wherein said airflow measuring apparatus operates in varying ambient temperatures, whereby said resistance of temperature varying resistor varies also as a function of said ambient temperature;
and wherein said regulator means further comprises additional resistor means (10) having a resistance varying as a function of temperature, mounted away from airflow, and responsive to said ambient temperature, and means for connecting said additional resistor means to said temperature varying resistor in such a manner that changes in said additional resistor means compensate for ambient temperature changes in said resistance of said temperature-varying resistor.

13. Apparatus as set forth in claim 12, wherein said regulator means comprises a bridge circuit having a first and second bridge arm;
and wherein said temperature varying resistor and said additional resistor means are connected in said first and second arm of said bridge circuit, respectively.

14. Apparatus as set forth in claim 1, wherein said temperature-varying resistor, said regulator means, and said additional heating means together constitute a unitary assembly located in the intake pipe.

15. In an internal combustion engine system having an air intake pipe (38) to induct air thereto and a switching means capable of turning the engine OFF and subject to periodic operation upon operation of the internal combustion engine system, having
an airflow measuring apparatus having a temperature-dependent resistance element positioned in the path of said airflow, and regulator means connected to said sensing element for controlling current flow through said sensing element in such a manner that said sensing element remains at a substantially contact operating temperature and wherein said sensing element accumulates undesired deposits during the operating life thereof;
a method for accurately determining air flow through the intake pipe of the engine by preventing the accumulation of said undesired deposits on the resistor, comprising the steps of
periodically commanding a deposit burn-off operation by increasing the current through said sensing element to a predetermined current heating said sensing element to a temperature substantially above said operating temperature, thereby burning off said deposits;
and controlling the occurrence of the burn-off operation as a function of the periodic operation of the switching means of the internal combustion engine system and while the engine is stopped or OFF.

16. A method as set forth in claim 15, wherein said step of increasing said current through said temperature dependent resistance element comprises the step of increasing said current through said resistance element for a predetermined time interval.

17. Method as set forth in claim 15, wherein the switching means of the internal combustion engine system is its main control switch;
and the step of controlling the occurrence of the burn-off operation is controlled upon opening of said main control switch resulting in stopping of the engine.

18. Method according to claim 17, including the step of differentiating the change-of-state signal occasioned upon operation of said main control switch;
and sensing when the polarity of the differentiated signal is such that it is representative of opening of the switch.

19. Method according to claim 18, wherein the main control switch comprises an ignition switch associated with the internal combustion engine system.

20. In an air flow measuring apparatus having a temperature sensing resistance element (11) positioned in said air flow, the resistance of which varies as a function of the quantity of air in said air flow, said element having a surface accumulating undesired deposits upon exposure to said air flow, a bridge circuit in which said resistance element (11) forms at least a portion of an arm thereof;
a regulator means (16) connected to said resistance element for furnishing a regulator signal heating the temperature varying resistance element to a selected temperature independent of the quantity of air flow, whereby the regulator current forms a signal which constitutes a measure of said quantity of air flow;
and additional resistance means (31) and switch means (32) connected to said additional resistance means for connecting said additional resistance means to said bridge circuit at selected time instants to unbalance said bridge circuit in a direction causing said regulator means to furnish a regulator current increasing the temperature of said temperature varying resistance element above said selected temperature and to a level sufficient to burn off accumulated undesired deposits.

21. Apparatus according to claim 20, wherein said temperature varying resistor is a structurally stabilized platinum wire.

22. Apparatus according to claim 20, wherein the air flow arises in the intake pipe of an internal combustion engine which has a main electrical operating switch;
and wherein said selected time instants are the time instants at which said main operating switch is turned OFF and hence the engine is stopped or OFF.

23. In an internal combustion engine system having an intake pipe (38) to induct air thereto,
an air flow measuring apparatus located in the intake pipe of the engine and having a temperature varying resistor (11) positioned in said intake pipe, said temperature varying resistor having a resistance characteristic varying as a function of the quantity of said air flow and a surface subject to accumulation of undesired deposits upon being exposed to said air flow, said air flow measuring apparatus further having regulator means (16) connected to said resistor for furnishing a regulator signal maintaining said temperature varying resistor at a selected temperature, whereby said regulator signal constitutes a measure of said quantity of said air flow,
a bridge circuit including said temperature varying resistor (11) in at least a portion of an arm thereof;
a temperature independent resistor (12) in another arm of said bridge circuit and serially connected to said temperature varying resistor (11), the temperature independent resistor being located downstream in the intake pipe (38) with respect to said air flow of said temperature varying resistor (11) for heating air flowing past said temperature dependent resistor in reverse direction and minimize change in resistance of said temperature varying resistor upon the occurrence of reverse flow pulses in said intake pipe during operation of the internal combustion engine.

24. In an internal combustion system having an air intake pipe (38) to induct air thereto and a switching means (35) subject to periodic operation upon operation of the engine system,
an airflow measuring apparatus located in the intake pipe of the engine having a temperature-varying resistor (11) forming a sensing element positioned in said intake pipe, said temperature-varying resistor having a resistance characteristic varying as a function of the quantity of said airflow and a surface accumulating undesired deposits upon being exposed to said airflow, said airflow measuring apparatus further having regulator means (16) connected to said sensing element for furnishing a regulator signal maintaining said sensing element at a selected temperature, whereby said regulator signal constitutes a measure of said quantity of said airflow,
electrical current supply means (32, 31) capable of supplying a current to said temperature-varying resistor for increasing the temperature of said temperature-varying resistor above said selected temperature and to a level sufficient to burn off said undesired deposits;
means controlled by said switching means upon said periodic operation to connect said current supply means to said temperature varying resistor upon said periodic operation of said switching means;
wherein said regulator means comprises a controlled current source (25, 26) connected to and supplying said temperature varying resistor (11), and a comparator-and-control amplifier (15) comparing an output signal representative of current flow through said temperature varying resistor with a reference (13, 14, 18);
and start-up signal generating means (27, 28) connected to said comparator-and-control amplifier (15) and applying a minimum signal thereto for comparison with the reference to permit output to be obtained by said comparator-and-control amplifier and initially control said controlled current source to supply the temperature varying resistor upon start-up of the system.

25. Apparatus according to claim 24 wherein the start-up signal generating means comprises a voltage divider (27, 28).

26. Apparatus according to claim 24 wherein the start-up signal generating means includes a diode (37) connected between a source for the minimum signal and the output signal from the temperature varying resistor (11) and poled to cut off said minimum signal when exceeded by the output from the temperature varying resistor.

27. Apparatus according to claim 26 wherein the source of minimum signal includes a voltage divider (27,28), the diode (37) connecting a tap point thereof to the comparator-and-control amplifier (15).

28. Apparatus according to claim 24 wherein said air flow measuring apparatus comprises a bridge circuit;

said temperature varying resistor (11) is connected in said bridge circuit, and having a resistance changing as a function of said air flow flowing therealong, thereby unbalancing said bridge circuit:

said comparator-and-control amplifier furnishing a regulator signal to said controlled current source (25, 26) for reheating the temperature varying resistor back to said selected temperature, independent of said quantity of air flow, whereby the amplitude of the regulator current constitutes said measure of said quantity of said air flow;

and wherein said additional heating means comprises additional resistance means (31) and a switch means (32) connected to said additional resistance means for connecting said additional resistance means to said bridge circuit at said selected time instants such as said bridge circuit is unbalanced in a direction causing said comparator-and-control amplifier (15) to furnish a regulator current increasing said temperature of said sensing element above said selected temperature.

29. Apparatus according to claim 28 wherein the comparator-and-control amplifier (15) includes an operational amplifier (15) having one input connected to receive the output signal from the temperature varying resistor, and another input connected to a reference branch (10, 13, 14) of said bridge circuit, one of said inputs being further connected to said additional resistance means (31) and said switch means, said start-up signal generating means (27, 28) including a voltage divider and a diode (37) connected to one of the inputs of the operational amplifier, the output from said operational amplifier furnishing the input control signal to said controlled current source (25, 26).

* * * * *